US011671785B2

(12) United States Patent
Versteeg et al.

(10) Patent No.: US 11,671,785 B2
(45) Date of Patent: *Jun. 6, 2023

(54) SYSTEM AND METHOD FOR DETERMINING A LOCATION AREA OF A MOBILE USER

(71) Applicant: InterDigital CE Patent Holdings, SAS, Issy-les-Moulineaux (FR)

(72) Inventors: Ernst Versteeg, Bern (CH); Eric Taillard, Yverdon-les-Bains (CH); Patrick Bailly, Puidoux (CH); Maxence Laurent, Yverdon-les-Bains (CH)

(73) Assignee: InterDigital CE Patent Holdings, SAS, Issy-les-Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,385

(22) Filed: Jul. 6, 2020

(65) Prior Publication Data

US 2021/0021956 A1 Jan. 21, 2021

Related U.S. Application Data

(63) Continuation of application No. 16/356,533, filed on Mar. 18, 2019, now Pat. No. 10,708,710, which is a (Continued)

(30) Foreign Application Priority Data

Dec. 13, 2007 (EP) .................................... 07405355

(51) Int. Cl.
*H04W 4/021* (2018.01)
*G01S 5/02* (2010.01)
(Continued)

(52) U.S. Cl.
CPC .......... *H04W 4/021* (2013.01); *G01S 5/0278* (2013.01); *G01S 5/02521* (2020.05); *H04B 7/026* (2013.01); *H04W 64/003* (2013.01)

(58) Field of Classification Search
CPC ..... H04W 52/40; H04W 24/10; H04W 88/08; H04W 24/08; H04W 36/06; H04W 36/18;
(Continued)

(56) References Cited

U.S. PATENT DOCUMENTS 4,696,027 A 9/1987 Bonta
4,751,725 A 6/1988 Bonta et al.
(Continued)

FOREIGN PATENT DOCUMENTS

WO 02065736 8/2002

OTHER PUBLICATIONS

E. Bertin, S. Arnouts: "SExtractor: Software for Source Extraction", Astronomy and Astropysics Supplement Series, vol. 117, Jun. 1, 1996, pp. 393-404.
(Continued)

*Primary Examiner* — Joseph Arevalo
(74) *Attorney, Agent, or Firm* — Flaster Greenberg, P.C.

(57) ABSTRACT

Systems and methods are provided for determining location area of mobile user devices. In a mobile device, a first area probability as a likelihood that the mobile device is located within a first area and a second area probability indicative of the mobile device being located within a second area may be determined, with the first area probability determined based on a first probability and a second probability, and the second area probability determined based on a third probability and a fourth probability. The first probability, second probability, third probability, and fourth probability are determined based on assessing strength received in the respective area from a first base station or a second base
(Continued)

station. A determination of whether the mobile device is located in the first area or the second area is made based on the first area probability and the second area probability.

20 Claims, 5 Drawing Sheets

Related U.S. Application Data continuation of application No. 15/692,864, filed on Aug. 31, 2017, now Pat. No. 10,237,684, which is a continuation of application No. 14/887,620, filed on Oct. 20, 2015, now Pat. No. 9,756,464, which is a continuation of application No. 14/023,001, filed on Sep. 10, 2013, now Pat. No. 9,167,552, which is a continuation of application No. 12/254,452, filed on Oct. 20, 2008, now Pat. No. 8,532,608.

(51) Int. Cl.
    *H04W 64/00*     (2009.01)
    *H04B 7/026*     (2017.01)

(58) Field of Classification Search
    CPC ... H04W 52/245; H04W 72/08; H04W 74/06; H04W 84/12; H04W 88/02; H04W 16/32; H04W 36/30; H04W 52/246; H04W 52/283
    USPC ... 455/456, 422.1, 404.1, 412.2, 134, 226.2, 455/432.1, 456.1, 436, 438, 410, 457, 455/63.1, 574, 234.1, 241.1, 404.2
    See application file for complete search history.

(56) References Cited

U.S. PATENT DOCUMENTS

| | | | |
|---|---|---|---|
| 5,051,741 A | 9/1991 | Wesby | |
| 6,173,078 B1 | 1/2001 | Kadono | |
| 6,405,043 B1 | 6/2002 | Jensen et al. | |
| 6,564,064 B1 | 5/2003 | Ciganer et al. | |
| 6,564,065 B1* | 5/2003 | Chang | H04W 64/00 342/357.29 |
| 6,931,252 B1 | 8/2005 | Aroudaki | |
| 7,493,114 B2* | 2/2009 | Lee | H04B 17/318 455/422.1 |
| 7,583,608 B2 | 9/2009 | Chimitt | |
| 7,715,849 B2* | 5/2010 | Spirito | H04W 64/00 455/414.2 |
| 8,145,237 B2 | 3/2012 | Versteeg | |
| 8,532,608 B2 | 9/2013 | Versteeg et al. | |
| 2003/0069027 A1* | 4/2003 | Heinonen | H04W 64/00 455/457 |
| 2003/0147423 A1 | 8/2003 | Jeanne et al. | |
| 2003/0211831 A1 | 11/2003 | Xu et al. | |
| 2003/0218537 A1 | 11/2003 | Hoch et al. | |
| 2004/0067759 A1 | 4/2004 | Spirito et al. | |
| 2004/0127230 A1 | 7/2004 | Bevan et al. | |
| 2005/0128139 A1 | 6/2005 | Misikangas et al. | |
| 2005/0131635 A1 | 6/2005 | Myllymaki et al. | |
| 2005/0267677 A1 | 12/2005 | Poykko et al. | |
| 2005/0272445 A1 | 12/2005 | Zellner | |
| 2005/0286718 A1 | 12/2005 | Meintrup et al. | |
| 2006/0052098 A1* | 3/2006 | Lee | H04B 17/23 455/422.1 |
| 2006/0068731 A1* | 3/2006 | Seier | H04B 17/23 455/226.2 |
| 2006/0073802 A1 | 4/2006 | Chari et al. | |
| 2006/0089134 A1 | 4/2006 | Moton, Jr. et al. | |
| 2006/0094447 A1 | 5/2006 | Zellner | |
| 2007/0001867 A1 | 1/2007 | Rowe et al. | |
| 2007/0037584 A1* | 2/2007 | Um | H04W 36/18 455/456.1 |
| 2007/0058739 A1* | 3/2007 | Aytur | H04L 27/2601 375/260 |
| 2007/0184834 A1 | 8/2007 | Jeong et al. | |
| 2007/0191029 A1 | 8/2007 | Zarem et al. | |
| 2008/0020785 A1 | 1/2008 | Liu et al. | |
| 2008/0133126 A1* | 6/2008 | Dupray | G01S 5/0252 701/408 |
| 2008/0153483 A1* | 6/2008 | Abu-Amara | H04W 8/06 455/432.1 |
| 2008/0186902 A1 | 8/2008 | Furukoshi et al. | |
| 2008/0219208 A1* | 9/2008 | Adams | H04W 48/20 370/328 |
| 2009/0082054 A1* | 3/2009 | Li | H04W 16/30 455/522 |
| 2010/0113061 A1* | 5/2010 | Holcman | G01S 5/0252 455/456.1 |
| 2010/0142477 A1* | 6/2010 | Yokota | H04W 36/0072 370/331 |
| 2010/0178925 A1 | 7/2010 | Bernini et al. | |
| 2010/0222081 A1 | 9/2010 | Ward et al. | |
| 2010/0322171 A1* | 12/2010 | Dekorsy | H04B 17/318 370/329 |
| 2013/0182683 A1 | 7/2013 | Seol et al. | |
| 2013/0231059 A1 | 9/2013 | Prasad et al. | |
| 2013/0285855 A1* | 10/2013 | Dupray | G01S 19/48 342/451 |
| 2021/0084558 A1* | 3/2021 | Speicher | H04W 36/08 |
| 2021/0084559 A1* | 3/2021 | Chaponniere | H04W 36/08 |

OTHER PUBLICATIONS

European Communication for EP 07405355, dated Jun. 4, 2008, (6 pages).
European Communication for EP 07405355, dated Oct. 11, 2011 (6 pages).
European Search Report for EP 17182288, dated Feb. 13, 2018, 2 pages.
"Channel Models for 60 GHz WLAN Systems", Alexander Maltsev, IEEE vol. 802.11ad, No. 6, Jan. 20, 2010, 119 pages.

\* cited by examiner

SYSTEM AND METHOD FOR DETERMINING A LOCATION AREA OF A MOBILE USER

CLAIM OF PRIORITY

This patent application is a continuation of U.S. patent application Ser. No. 16/356,533, filed on Mar. 18, 2019, which is a continuation of U.S. patent application Ser. No. 15/692,864, filed on Aug. 31, 2017, which is a continuation of U.S. patent application Ser. No. 14/887,620, filed on Oct. 20, 2015, which is a continuation of U.S. patent application Ser. No. 14/023,001, filed on Sep. 10, 2013, which is a continuation of U.S. patent application Ser. No. 12/254,452, filed on Oct. 20, 2008, which in turn claims priority from European (EP) Patent Application Serial No. 07405355.4, filed on Dec. 13, 2007. Each of the above identified applications is hereby incorporated herein by reference in its entirety.

FIELD OF THE INVENTION

The present invention relates to a system and a method for determining a location area of a mobile user. Specifically, the present invention relates to a computer system and a computer-implemented method for determining a location area of a user using a mobile communication terminal in a geographical area covered by a mobile radio network.

BACKGROUND OF THE INVENTION

For various location based services as well as for handling emergency situations, it is essential to determine as accurately as possible the geographical location of a user of a mobile communication terminal. Mobile communication terminals include, for example, mobile radio (cellular) telephones or personal digital assistants (PDA) as well as other portable computers with communication modules for mobile radio networks, such as GSM (Global System for Mobile Communication) or UMTS (Universal Mobile Telecommunication System). Although there are mobile communication terminals available which include a GPS-receiver (Global Positioning System) or another satellite-based positioning system, there is still a need for other location methods, as for example locating mobile communication terminals which are not equipped with such positioning systems, mobile communication terminals which have their GPS turned off or inside of buildings where the GPS signal is too weak. It is known from the mobile network which antenna the user is using. However, particularly in rural areas, an area served by an antenna can cover a very large geographical area. Unfortunately today calculations of these areas are not accurate, often they are too large or they are not reliable, and in reality mobile communication terminals are often located outside of these areas (low hit rate).

It is essential to determine smaller and more reliable location areas of mobile users in geographical areas covered by mobile radio networks. Particularly, there are legal regulations which require the geographical locations of users of mobile communication terminals to be provided as shapes which define a geographical area where the mobile user is most likely located. These shapes are required to be described in a simple and straightforward geometric fashion, e.g. in the form of polygons, a circle or one or more ellipses.

GB 2352134 describes a method of locating a mobile telephone based on a calculation of expected signal properties such as signal strength or observed time differences for a plurality of possible locations, e.g. arranged in a grid. The expected signal property is compared to a measured signal property. Based on the comparison, determined is the probability that the mobile telephone is at one or more of the locations. Thus, the method of GB 2352134 is based on the actual values of the field strength or time differences measured at the mobile telephone. However, these values would have to be transmitted from the mobile telephones to a centralized measuring system and are therefore not necessarily available for locating a mobile telephone. Furthermore, manufacturers of proprietary network components do not necessarily make such values available to the operators of mobile networks or they sell them at considerable cost. The method does also fail when there are less than 3 antennas available, or if the visible antennas are arranged along a line, for example, in mountain areas.

Patent application WO 99/07177 describes a method of determining the location of a mobile communication terminal using elliptical position estimates as an improvement over circular estimates. However, the teachings of WO 99/07177 are limited to defining an elliptical position estimate based on 1000 simulated locations which form a substantially symmetrical and elliptical statistical sample. Typically, however, measurement data from real networks do not provide symmetrical and elliptical clusters of possible locations of a mobile user. The location areas do have in reality very different shapes, depending for example on the position of other antennas or the elevation model of the geographical area, for example hills and valleys. Furthermore, when polygons or ellipses are created around estimated locations, they can cover very large areas, because just one single estimated location point, far away from all other location points, can possibly enlarge the polygons or ellipses more than 100 times. Thus, for real life scenarios it is necessary to reduce the hit rate and therefore find polygons or ellipses which cover much smaller location areas, in fact as small as possible, but still with a satisfactory hit rate (probability) of over 95%, for example.

SUMMARY OF THE INVENTION

It is an object of this invention to provide a system and a method for determining a geographical location area of a mobile user. In particular, it is an object of this invention to provide a system and a method for determining one or more elliptical location areas of a user using a mobile communication terminal in a geographical area covered by the mobile radio network.

According to the present invention, these objects are achieved particularly through the features of the independent claims. In addition, further advantageous embodiments follow from the dependent claims and the description.

According to the present invention, the above-mentioned objects are particularly achieved in that, for determining a location area of a user using a mobile communication terminal in a geographical area covered by a mobile radio network, the geographical area is divided into a plurality of sub-areas. For example, the geographical area is divided into sub-areas of equal shape and size, having a diameter in the range of 50 to 150 meters. For example, the sub-areas are squares arranged in a grid, or hexagons arranged in a comb structure. Based on field strengths expected in the sub-areas for antennas located in the geographical area, and based on the antenna used by the mobile communication terminal, location probabilities are determined for the sub-areas. The location probabilities indicate the probability that the mobile communication terminal is located in the respective sub-area, Preferably, the location probabilities are determined based on antenna probabilities associated with the sub-areas. The antenna probabilities indicate for at least some of the antennas, the probability that the mobile communication terminal, when located in a particular sub-area, uses the respective antenna. The antenna probabilities are determined based on the field strengths expected in the sub-areas for the respective antennas. Specifically, the antenna probabilities are determined from the distribution of field strengths in the sub-areas for the respective antennas, combined with the knowledge that the mobile communication terminal typically uses the antenna with the highest real field strength at each location of the sub-area. The resulting antenna probabilities do have a high reliability, as the uncertainty of the precision of the prediction of the field strength is statistically fully taken into account in the antenna probability calculation. Subsequently, based on the location probabilities of the sub-areas, determined is at least one ellipse defining the location area. Determining an elliptic location area based on the location probabilities of the sub-areas makes it possible to provide information about the location of the mobile communication terminal in the geographical area based on the antenna used, with elliptical location areas of mobile users much smaller than the area each antenna covers physically, but without the need for measuring at the mobile communication terminal signal properties such as signal strength or observed time differences, and without the requirement to have everywhere coverage of at least three antennas not arranged along a line.

In a first approach, the ellipse is determined by defining a single ellipse around a polygon enveloping probable sub-areas having at least a defined minimum location probability. The location area is defined by the single ellipse, if the number of the probable sub-areas is lower than a defined maximum number of sub-areas, e.g. less than two hundred sub-areas, and a density of the probable sub-areas is higher than a defined minimum density, i.e. if there are a sufficient number of sub-areas with a high location probability included in the ellipse. For example, the density is defined by the ratio of the number of probable sub-areas included in the ellipse to the number of total sub-areas considered in the ellipse. If the density of probable sub-areas is not sufficient, more than one ellipse is determined for defining the location area.

For determining more than one ellipse, in a second approach, determined are sub-areas to be considered by selecting from the sub-areas with descending location probability those sub-areas which together make up at least a defined target probability. It should be noted that prior to selecting the sub-areas to be considered, a smoothing filter is applied to the location probabilities of the sub-areas, smoothing out the values of the location probabilities. Subsequently, the sub-areas to be considered are grouped into areas of connected sub-areas, and to define the location area an ellipse is determined around each of the areas of connected sub-areas. For example, an area of connected sub-areas is determined by selecting with descending location probability from the sub-areas to be considered sub-areas which share a common border with a sub-area already included in the respective area of connected sub-areas. Selected sub-areas are removed from the sub-areas to be considered. An area of connected sub-areas is started with the sub-area of the remaining sub-areas to be considered having the highest location probability.

In an embodiment, the target probability is increased, if the number of ellipses obtained exceeds a defined maximum number of ellipses, and determination of more than one ellipse is repeated using the increased target probability.

For determining more than one ellipse, in a third approach, an ellipse is enlarged using those sub-areas closest to the ellipse which have an intermediate area with at least a defined minimum mean location probability. New ellipses are generated at sub-areas where the mean location probability of the intermediate area is below the minimum mean location probability, if the maximum number of ellipses has not been reached. Preferably, the intermediate area is a geometric object, placed between the sub-area in question and the ellipse closest to the sub-area in question. For example, the intermediate area is a circle.

In an embodiment, the defined minimum mean location probability is lowered, if the defined target probability has not been reached, and the determination of more than one ellipse is repeated using the lowered minimum mean location probability.

In addition to a computer system and a computer-implemented method for determining a location area of a user using a mobile communication terminal in a geographical area covered by a mobile radio network, the present invention also relates to a computer program product including computer program code means for controlling one or more processors of a computer system, particularly, a computer program product including a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
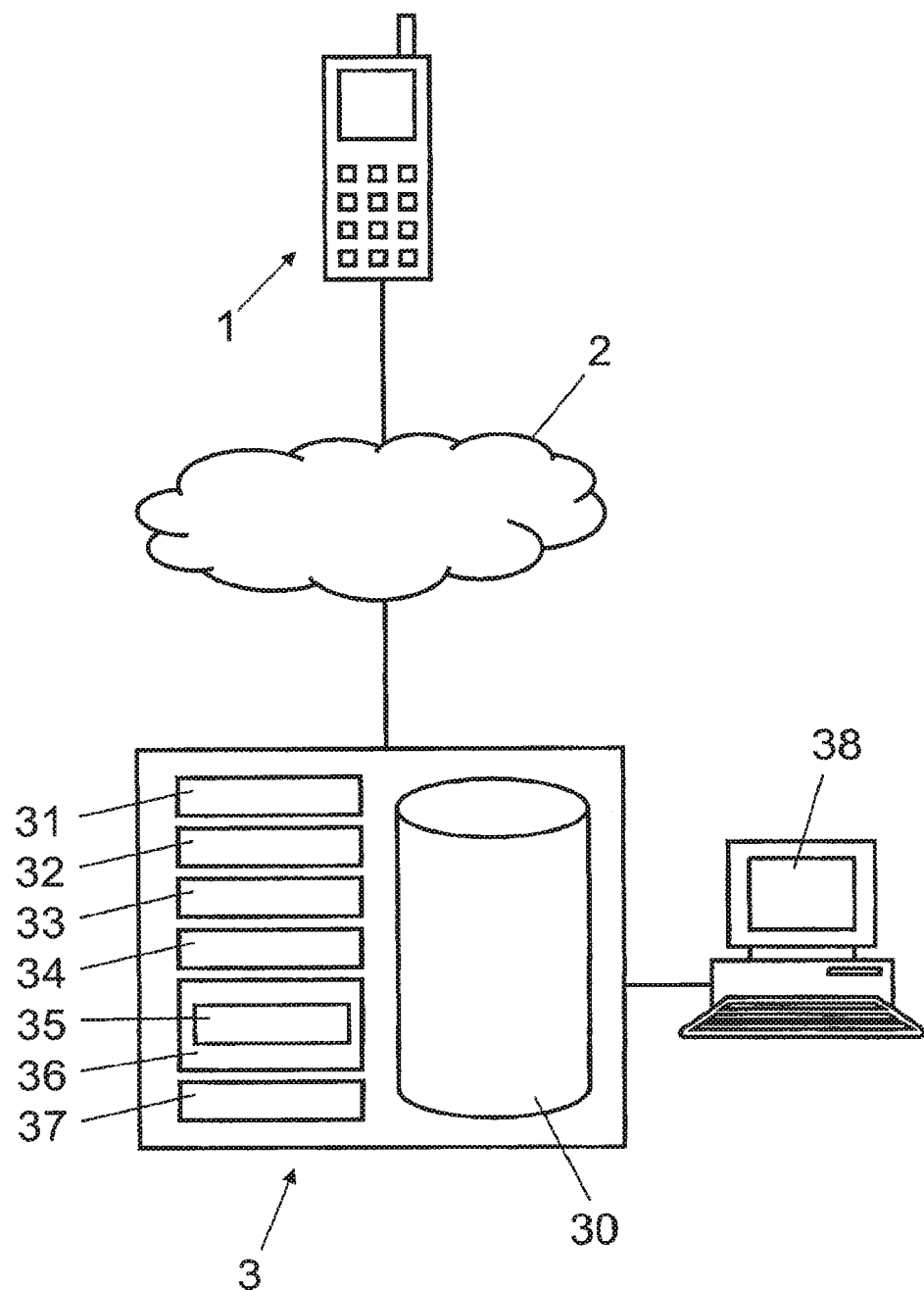
FIG. 1 shows a block diagram illustrating schematically an exemplary configuration of a system for locating a mobile communication terminal associated with a mobile radio network.

In FIG. 1, reference numeral 1 refers to a mobile communication terminal such as a mobile radio (cellular) telephone, a PDA or another portable computer. The mobile communication terminal 1 comprises a communication module for communicating (voice and/or data) via mobile radio network 2, e.g. a GSM or UMTS network or another cellular radio network. As illustrated schematically in FIG. 3, the cellular network comprises a plurality of antennas A1, A2, A3, A4, each covering a more or less overlapping area C1, C2, C3, C4 of the geographical area 4. Each antenna A1, A2, A3, A4 is controlled by a base station connected to a mobile switching center (e.g. MSC) of the mobile radio network 2. The antennas A1, A2, A3, A4 are identified by their identification id in the network, which correspond to the areas C1, 02, C3, C4.

In FIG. 1, reference numeral 3 refers to a computer system connected to the mobile radio network 2. Computer system 3 includes one or more computers, for example personal computers or servers, comprising one or more processors. Computer system 3 further comprises at least one data entry and display terminal 38 connected to at least one of its computers. Furthermore, computer system 3 comprises a data store 30, e.g. a database and/or one or more data files and various functional modules namely a sub-area definition module 31, a field strength prediction module 32, an antenna probability calculation module 33, an antenna determination module 34, a location probability calculation module 35, a location determination module 36, and a location area determination module 37. Preferably, the functional modules and the data store 30 are implemented as programmed software modules. The computer program code of the software modules is stored in a computer program product, i.e. in a computer readable medium, either in memory integrated in a computer of computer system 3 or on a data carrier which can be inserted into a computer of computer system 3. The computer program code of the software modules controls the computer(s) of computer system 3 so that the computer system 3 executes various functions described in the following paragraphs with reference to FIGS. 2 to 4.

Figure 2:
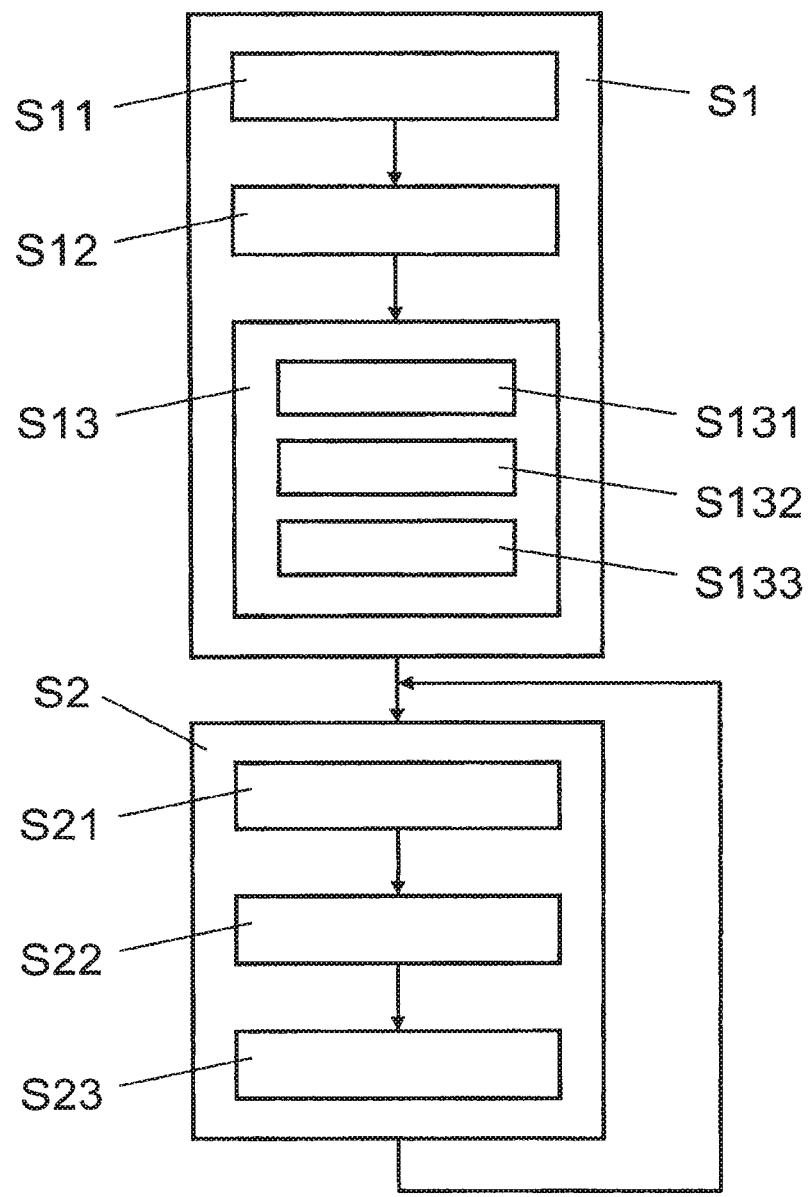
FIG. 2 shows a flow diagram illustrating an example of a sequence of steps executed for locating the mobile communication terminal in a geographical area.

As illustrated schematically in FIG. 2, computer system 3 is configured to perform preparatory step S1 for generating, for all sub-areas 41, 43, antenna probabilities which indicate for each sub-area the probability a mobile communication terminal 1 located in this sub-area uses the respective antenna A1, A2, A3, A4 for registering and/or communicating with the mobile radio network 2. Preparatory step S1 is performed periodically, e.g. monthly, and/or whenever there is a significant change in the radio network, e.g. if an antenna A1, A2, A3, A4 is turned off, a new antenna is added or settings of an antenna are altered.

Furthermore, computer system 3 is configured to perform step 32 for locating the mobile communication terminal 1 in the geographical area 4. Step S2 is performed as requested by a user of data entry terminal 3, a control application running on computer system 3, or a location based service application running on computer system 3 or a remote computer system.

Figure 3:
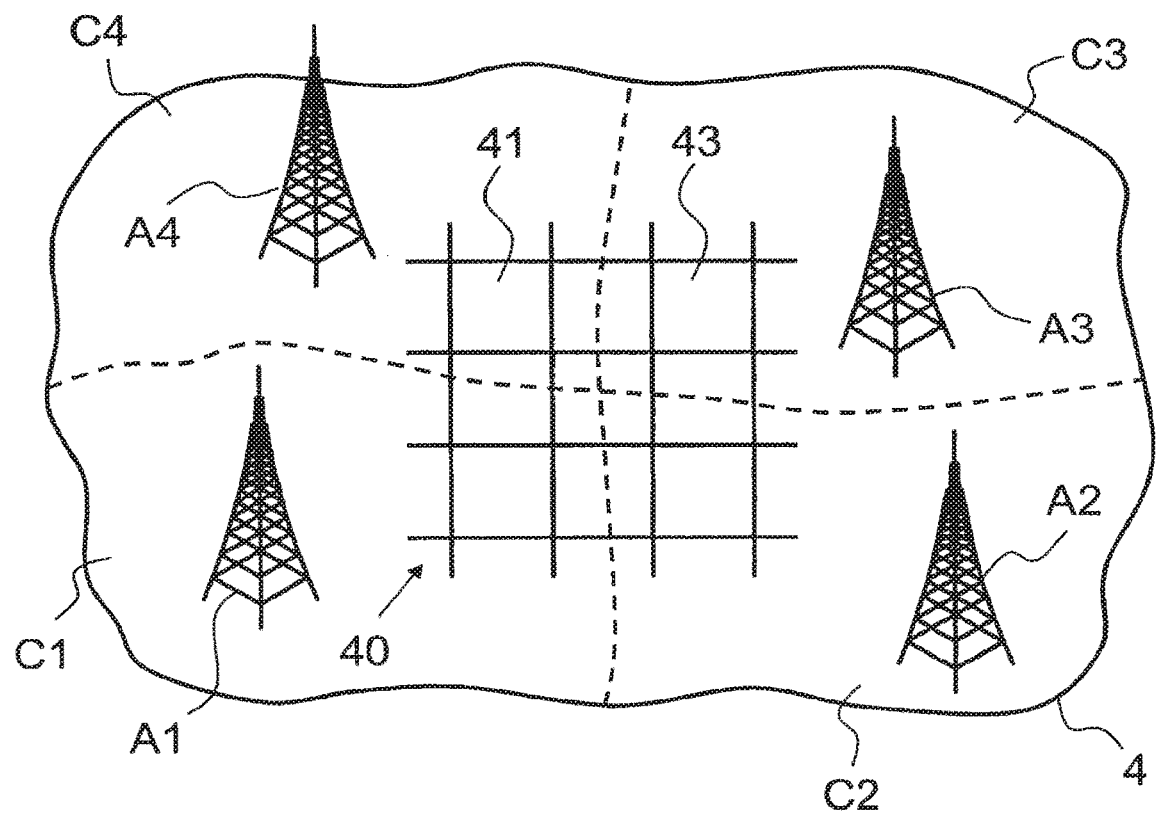
FIG. 3 shows a block diagram illustrating schematically sub-areas of a partial region of a geographical area covered by antennas of the mobile radio network.

In step 311, sub-area definition module 31 divides the geographical area 4 into a plurality of sub-areas 41, 43, as illustrated schematically in FIG. 3. In the example of FIG. 3, the geographical area 4 is divided into a grid 40 of equal-sized squares, each square defining a sub-area 41, 43. For example, the sub-areas 41, 43 are squares of 100 m×100 m. One skilled in the art will understand that alternative shapes of sub-areas are possible, for example, the geographical area 4 may be divided into hexagons arranged in a comb structure. Furthermore, it is also possible to have various sizes of sub-areas, for example smaller sub-areas may be used in zones of increased interest and/or population. Typically, a sub-area is defined by a unique identifier and one or more parameters which describe direct or indirect the position coordinates. Depending on the embodiment, a sub-area is further defined by sub-area type, size and/or shape information. Thus, sub-area definition module 31 defines and stores in the data store 30 a list or array comprising the defined sub-areas 41, 43 of the geographical area 4. In an embodiment, the sub-area definition module 31 is configured to read the definition of the sub-areas from a data file.

In an embodiment, the sub-area definition module 31 is configured to support manual or file based entry of the antenna probability of antennas, which would require in the following steps a full 3D modeling of radio propagation, taking into account the exact position of the antenna inside of a 3D physical environment, as for example an enclosed space such as in a tunnel, or on different floors in shops or railway stations. As there are not many of these enclosed antennas and the propagation of the radiation does usually follow the physical shape of the environment where they are installed, the antenna probability of the enclosed antennas are manually acquired based on maps where these antennas are located and loaded into the data store 30. In an embodiment shapes assigned to enclosed antennas are loaded into the data store 30 and all antenna probabilities are set to 100% when the sub-area is inside an enclosed space including an enclosed antenna.

In step S12, field strength prediction module 32 calculates, for all the sub-areas 41, 43 defined for the geographical area 4, the field strengths expected in the respective sub-area 41, 43 from the antennas A1, A2, A3, A4 of the mobile radio network 2, considering data about topography and power characteristics associated with the antennas A1, A2, A3, A4. Field strength prediction modules 32 are available commercially, e.g. offered by Aricom International. Preferably, only the antennas A1, A2, A3, A4 having the highest expected field strength values are stored for a sub-area 41, 43 in data store 30. For example, the field strength values are stored for a defined (configurable) number of the strongest antennas A1, A2, A3, A4, e.g. for the seven or fourteen strongest antennas. Table 1 shows exemplary entries of expected field strengths in data store 30. In the example of Table 1, a field strength of −41 dBm is expected in sub-area 41 for antenna A4, whereas a field strength of −52 dBm is expected in the same sub-area for antenna A1; likewise, in sub-area 43, a field strength of −42 dBm is expected for antenna A3, whereas a field strength of −48 dBm is expected for antenna A4. In addition or as an alternative to a unique identifier, antenna data may include antenna coordinates or grid positions, for example. Moreover, in addition to the field strength value, further field strength data may include standard deviations for the expected field strength distribution of the antenna in the respective sub-area. Thus, the field strength for a given sub-area i is preferably modeled as a random variable having a normal distribution with expected value $d_i$ and standard deviation $s_i$. Modeling the field strength as a distribution is necessary because the real field strengths do have big variations, depending on the exact position inside the sub-area, location of buildings, weather conditions, how the mobile communication terminal is oriented in space and many other factors. Instead of considering all these factors into the model calculation, the resulting normal distribution can be used and its standard deviation measured in field tests where the real field strengths are compared with expected field strengths for many test calls.

TABLE 1

| sub-area | | antenna | | expected field strength | |
| --- | --- | --- | --- | --- | --- |
| sub-area identifier | sub-area data | antenna identifier | antenna data | field strength value | further field strength data |
| ... | ... | ... | ... | ... | ... |
| 41 | ... | A4 | ... | −41 dBm | ... |
| 41 | ... | A1 | ... | −52 dBm | ... |
| 41 | ... | A3 | ... | −55 dBm | ... |
| ... | ... | ... | ... | ... | ... |

TABLE 1-continued

| sub-area | | antenna | | expected field strength | |
|---|---|---|---|---|---|
| sub-area identifier | sub-area data | antenna identifier | antenna data | field strength value | further field strength data |
| 43 | ... | A3 | ... | −42 dBm | ... |
| 43 | ... | A4 | ... | −48 dBm | ... |
| 43 | ... | A2 | ... | −51 dBm | ... |
| ... | ... | ... | ... | ... | ... |

In step S13, antenna probability calculation module 33 determines for each sub-area 41, 43 the antenna probabilities for the antennas A1, A2, A3, A4.

In sub-step S131, based on the expected field strength values stored in the database or collection of files 30, antenna probability calculation module 33 calculates for each sub-area 41, 43 the antenna probabilities, i.e. the probability in the respective sub-area 41, 43, the antenna A1, A2, A3, A4 is being used by a mobile communication terminal 1 for registering and/or communicating with mobile radio network 2, as outlined below.

Figure 4:
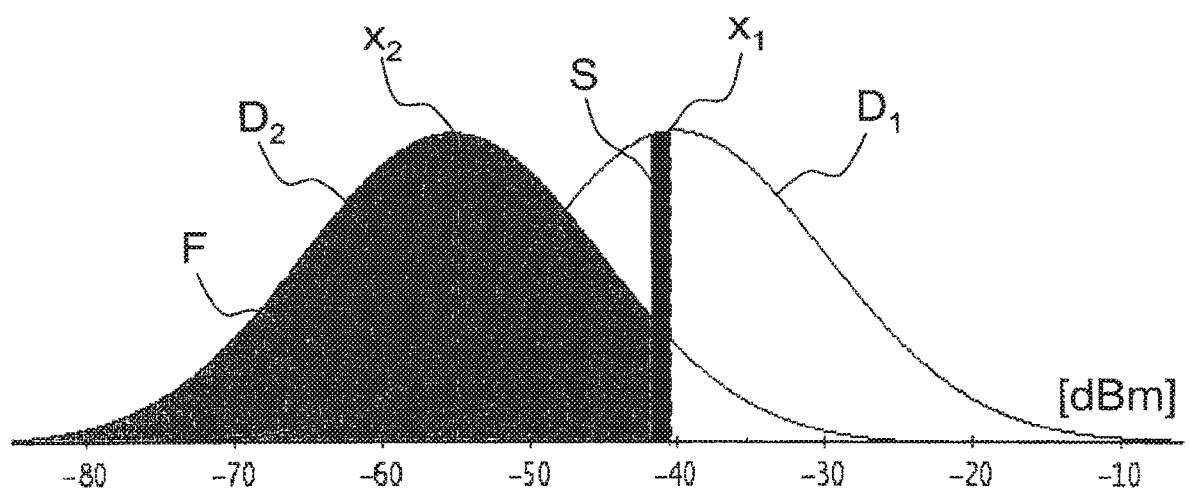
FIG. 4 shows a graph illustrating exemplary distributions of the field strengths expected in a sub-area from two different antennas.

In FIG. 4, $x_1$ refers to the expected field strength (here −41 dBm) of an antenna A1 at a given location, i.e. in a given sub-area 41, 43. Reference numeral $D_1$ refers to the distribution of the real field strength which can be measured at this sub-area with a mobile communication terminal. In this sample it is likely that the real field strength will be around −41 dBm, but sometimes the field strength is −45 dBm, sometimes −37 dBm, it will change depending on the precise location within the sub-area 41, 43, e.g. within the 100 m×100 m square, the weather, the type of terminal, how the terminal is oriented in space, etc. Likewise, $x_2$ refers to the expected field strength (here −55 dBm) of another antenna A2 in the same sub-area 41, 43, and reference numeral $D_2$ refers to the distribution of the real field strength of antenna A2. For calculating the probability that the mobile communication terminal 1 will use antenna A1 in the respective sub-area 41, 43, distribution $D_1$ of the real field strength of antenna A1 is divided into small sectors, such as sector S showing the probability that the real field strength of antenna A1 is in a small range between −40 dBm and −41 dBm. For calculating the probability the real field strength of antenna A1 is between −40 dBm and −41 dBm, and higher than the real field strength of antenna A2 (resulting in the use of antenna A1), the following two probabilities are used:

1) Probability that the real field strength of antenna A1 is between −40 dBm and −41 dBm, which corresponds to the area of section S between −40 dBm and −41 dBm; and
2) Probability that the real field strength of antenna A2 will be less than −41 dBm, which corresponds to area F below −41 dBm.

As probabilities 1) and 2) are independent, the probability that both conditions are met at the same time can be calculated by multiplying the probabilities 1) and 2) (product of areas S and F).

The above calculated probability is restricted to the case where antenna A1 is between −40 dBm and −41 dBm. For calculating the probability 3) for all real fields strengths of antenna A1, the limit is calculated for all summed products of S and F for all real field strengths between −infinity to +infinity, while letting the width of the sector S go to zero. This results in the following integral:

$$p_{A1} = \int_{-\infty}^{\infty} N(x, d_{A1}, s_{A1}) \cdot F(x, d_{A2}, s_{A2}) \cdot dx$$

$N(x, d_{A1}, s_{A1})$ is the normal distribution of the real field strength x of antenna A1, with expected power level $d_{A1}$ and standard deviation $s_{A1}$:

$$N(x, d_{A1}, s_{A1}) = \frac{1}{s_{A1}\sqrt{2\pi}} e^{-\frac{1}{2}\left(\frac{x-d_{A1}}{s_{A1}}\right)^2}$$

$F(x, d_{A2}, s_{A2})$ is the probability the real field strength y of the antenna A2 with expected power level $d_{A2}$ and standard deviation $s_{A2}$ is lower than x:

$$F(x, d_{A2}, s_{A2}) = \int_{-\infty}^{x} N(y, d_{A2}, s_{A2}) dy$$

For example, F(−60, −40, 5) is the probability the real field strength will be between −infinity and −60, for a normal distribution at x=−40 and a standard deviation of 5.

Taking into account another antenna A3 is straightforward, as it is another independent condition which has to be met, so the antenna A1 is still used rather than the antennas A2 or A3. So the probability 3) outlined above can be extended with this additional condition, which is the probability that the field strength of antenna A3 is smaller than x. The resulting probability 4) is:

$$p_{A1} = \int_{-\infty}^{\infty} N(x, d_{A1}, s_{A1}) \cdot F(x, d_{A2}, s_{A2}) \cdot F(x, d_{A3}, s_{A3}) \cdot dx$$

More antennas are taken into account the same way as antennas A2 and A3. In addition the variable substitution $d_{A1} < > d_{A1}$ and $s_{A1} < > d_{Ai}$ does allow to calculate the probability the call will go to one of the other antennas $A_i$. This does allow rephrasing the calculation 4) in a general way. So the antenna probability $p_{Ai}$ 5) that the mobile communication terminal will connect to a given antenna $A_i$ with an expected power level $d_{Ai}$ and standard deviation $s_{A1}$ is given by:

$$p_{Ai} = \int_{-\infty}^{\infty} N(x, d_{Ai}, s_{Ai}) \cdot \prod_{j=1, j \neq i}^{n} F(x, d_{Aj}, s_{Aj}) \cdot dx$$

In an embodiment, for each network type the same standard deviation is used for $s_{Ai}$. For GMS networks, a deviation of 10 is used, for UMTS networks a deviation of 4. In a further embodiment, higher deviations are used with increased distance of a sub-area 41, 43 from the respective antenna A1, A2, A3, A4, For example, a standard deviation of approximately 8 is used for UMTS networks, if the antenna is located farther than 5 km from the respective sub-area.

As the mobile communication terminals 1 cannot make a call-setup, if the field strength is below a certain value, the lower limit in the formulas outlined above is adjusted from −infinity to a defined (configurable) minimum field strength, depending on the network type of the cell being GSM or UMTS, for example. Furthermore, as the mobile communication terminal 1 and the mobile radio network 2 do not distinguish in the antenna selection field strength values higher than a defined (configurable) value, e.g. −40 dBm, all expected field strength values above this value are limited to this value.

The integral cannot be solved algebraically. As the input data is imprecise, it is not necessary to have an infinite precision in the probability calculation. So $N(x, d_i, s_i)$ can be approximated by 0 in the regions of $X \leq d_i-5s_i$ and $x \geq d_i+5s_i$. Which is the same as when the boundaries]$-\infty,\infty$[are replaced by $[d_i-5s_i, d_i+5s_i]$. In a next approximation step the interval is divided into a finite number of segments, e.g. 10 or 20, for numerical integration with the Simpson's method. For speeding up the automatic computation, values of $N(x_k, 0, 1)$ and $F(y_k, 0, 1)$ can be precomputed and stored for different values of $x_k$ or $y_k$, respectively.

In step S132, antenna probability calculation module 33 sets the antenna probabilities of enclosed antennas to the values loaded in step S11 into data store 30. In an embodiment all antenna probabilities are set to 100%, which are inside enclosed spaces assigned to enclosed antennas, which were loaded before in step S11 into data store 30.

In step S133, antenna probability calculation module 33 takes into account mobile communication terminals, configured to switch automatically between different networks as for example GSM or UMTS, This does affect the location area. The implementation of antenna probability calculation module 33 depends on how multiband mobile communication terminals select the network type. This has to be estimated in the field or in a lab using multiband terminals with different signal levels from multiple networks. In an embodiment of antenna probability calculation module 33, for GSM and UMTS, the antenna probabilities are calculated separate for each network, as according to the measurements multiband mobile communication terminals always prefer UMTS whenever available. This way no terminal detection is necessary. It does only have the disadvantage that GSM areas could be smaller for multiband mobile communication terminals in GSM areas, where there is UMTS coverage as long as UMTS is not turned off on the mobile communication terminal. In an embodiment, it is possible to use a mobile communication terminal detection and calculate the GSM areas for multiband mobile communication terminals separately; setting on each sub-area the antenna probability of all GSM antennas to zero if there is an UMTS antenna available with more than a defined (configurable) minimum field strength.

The antenna probabilities resulting from step S13 are stored temporarily for each antenna in the memory of the computer system 3 or in data store 30. For example, the antenna probabilities are stored for a defined (configurable) number of the strongest antennas A1, A2, A3, A4, e.g. for the seven or fourteen strongest antennas. Table 2 shows exemplary entries of calculated antenna probabilities in data store 30. In the example of Table 2, for sub-area 41, it is expected that with a probability of 50% antenna A4 will be used, whereas the probability of antenna A1 is 25%; likewise, for sub-area 43, a probability of 40% is expected for antenna A3, whereas a probability of 35% is expected for antenna A4. One skilled in the art will understand that Tables 1 and 2 may be combined in one or more files or in a common table.

TABLE 2

| sub-area | | antenna | | |
|---|---|---|---|---|
| sub-area identifier | sub-area data | antenna identifier | antenna data | antenna probability |
| ... | ... | ... | ... | ... |
| 41 | ... | A4 | ... | 50% |
| 41 | ... | A1 | ... | 25% |
| 41 | ... | A3 | ... | 15% |
| ... | ... | ... | ... | ... |
| 43 | ... | A3 | ... | 40% |

TABLE 2-continued

| sub-area | | antenna | | |
|---|---|---|---|---|
| sub-area identifier | sub-area data | antenna identifier | antenna data | antenna probability |
| 43 | ... | A4 | ... | 35% |
| 43 | ... | A2 | ... | 10% |
| ... | ... | ... | ... | ... |

In step S21, antenna determination module 34 determines for a particular mobile communication terminal 1 the antenna A1, A2, A3, A4 used, i.e. the antenna currently or last used, from identification data provided by the mobile radio network 2, e.g. cell identifier or base station identifier. In different embodiments and/or applications, this information is obtained by antenna determination module 34 from the MSC of the mobile radio network 2, the Home Location Register (HLR) associated with the mobile communication terminal 1, or the Visitor Location Register (VLR) or another network component of the mobile radio network 2. In a further embodiment, antenna determination module 34 is configured to send a message to the mobile communication terminal 1, e.g. an (invisible) SMS (Short Messaging Services) or USSD (Unstructured Supplementary Service Data) message, to trigger the mobile communication terminal 1 to use an antenna A1, A2, A3, A4 from the current location and, thus, update the respective identification information in the mobile radio network 2. In a further embodiment, the antenna determination module 34 is configured to receive identification information for defining the antenna used by the user or the mobile communication terminal 1, respectively, from an operator or a software application, for example.

In step S22, location probability calculation module 35 calculates for each sub-area of an antenna a location probability, which is the probability that the user is in the respective sub-area.

In an embodiment location probability calculation module 35 first reduces the size of the user location areas using additional parameters from the network, obtained by antenna determination module 34, for example TA (timing advance) or RTT (round trip time). These parameters can be used to indicate the probability the sub-area does have the respective parameter, depending on the distance between the sub-area and antenna. Field tests are made in advance to estimate the distribution of distance for each possible value of one of these parameters. If, depending on the network 2, antenna determination module 34 is able to deliver such a parameter, for example for a call timing advance of four (4), it is possible to calculate the probability that both will happen: the mobile communication terminal 1 selects at a sub-area a given antenna AND the network parameter from antenna determination module 34 is four (4). As both conditions are independent the combined probability can be calculated multiplying the antenna probability and the probability for the parameter from antenna determination module 34 being four (4). The resulting combined probability is used in the following steps as an improvement for the antenna probability calculated before.

The sum of all location probabilities of an antenna is one (1), as it is known from the network which antenna is used. This allows calculating the distribution of location probability $P_{Li}$ in all sub-areas from the antenna probability $P_{Ai}$ calculated in the steps before and the total antenna probability of all n sub-areas:

$$P_{Li} = \frac{P_{Ai}}{\sum_{n} P_{Aj}},$$

The calculated location probabilities are calculated and stored for each antenna and its sub-areas 41, 43 in data store 30. It must be noted that one antenna can have one or more sub-areas 41, 43 with a location probability >0, and one sub-area 41, 43 can have more than one antenna with a location probability >0.

In an embodiment, location probability calculation module 35 reduces the size of areas with a minimal antenna probability using a sequence of historical location determinations, calculating for each location determination the location is probability as in the steps before, calculating for each location determination the time until the last location determination, calculating for each location determination the maximum distance the user can have traveled in all directions and spreading for each location determination all probabilities of the respective sub-area in the range between zero and the max distance. The resulting location probabilities for each location determination are then blended multiplying the resulting location probabilities. The resulting combined location probabilities are used in the following steps as an improvement for the location probabilities calculated before.

In step S23, location determination module 36 optimizes the location probabilities, correcting in this last step errors which are caused by limitations of the granularity of the grid or input data used for calculating the field strength predictions. In one embodiment, to correct for errors caused by the limitation of the granularity of the grid or comb structure, for each antenna all location probabilities >0 are expanded at the border twice the size of the grid, e.g. 200 meters. In another embodiment, the location determination module 36 is further configured to show the resulting location probabilities for each antenna A1, A2, A3, A4 graphically on a display of data entry terminal 38, the sub-areas 41, 43 having a location probability >0, for example color coded in a way a high value of the location probability correlate with color schemas as for example black/grey/white or different shades of one or more colors like, for example, white, blue and red. In yet another embodiment, e.g. in order to adhere to government regulations, generated and displayed is a location area, based on the determined location probabilities, for example an elliptical location area, representative of the geographical area where the mobile communication terminal 1 is expected to be located when the respective antenna was used by the mobile communication terminal 1. In a further embodiment, computer system 3 comprises a communication module configured to transmit the determined location probabilities, a graphic representation of the location probabilities and/or the (elliptical) location area to a mobile communication terminal 1. In this further embodiment, the mobile communication terminal 1 is configured to show the received location probabilities and/or location area on a map, e.g. using geographical information services such as Google Maps by Google Inc.

Figure 5:
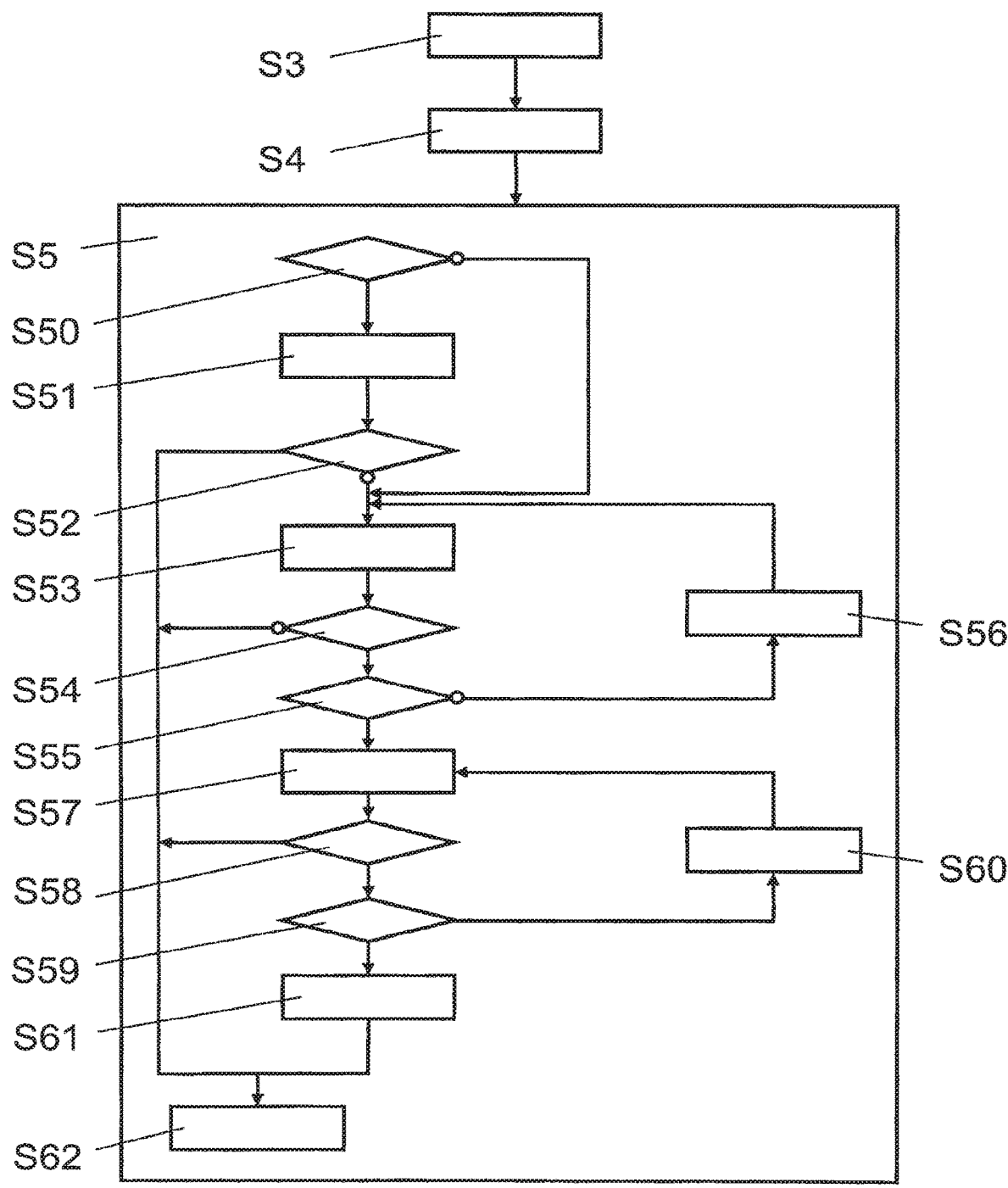
FIG. 5 shows a flow diagram illustrating an example of a sequence of steps executed for determining a locating area of the mobile communication terminal in the geographical area.
Figure 6:
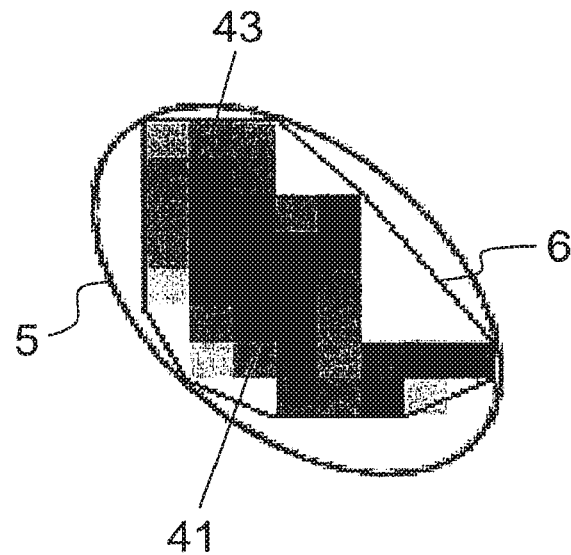
FIG. 6 shows a diagram illustrating a single e p around a polygon enveloping probable sub-areas.

As illustrated schematically in FIG. 5, computer system 3 is configured to determine in step S5 an estimated location area of a user using the mobile communication terminal 1 in the geographical area 4 covered by the mobile radio network 2.

In step S3, computer system 3 divides the geographical area 4 into a plurality of sub-areas 41, 43, as described above in the context of step S11.

In step S4, based on the field strengths expected in the sub-areas 41, 43 for the antennas A1, A2, A3, A4 located in the geographical area 4, and based on the antenna used by the mobile communication terminal 1, the computer system 3 determines for the sub-areas 41, 43 location probabilities, indicative of the probability that the mobile communication terminal 1 is located in the respective sub-area 41, 43, as described above in the context of steps S1, S2 and particularly S22.

In step S5, based on the calculated location probabilities of the sub-areas 41, 43, the location area determination module 37 determines at least one ellipse defining the location area for each antenna.

In step S50, the location area determination module 37 first checks if there are only few sub-areas. In this case, small changes in the input values which are used for the field strength calculation do result in very different ellipses. These kinds of ellipses cannot be used in practice. One of the possible solutions is to select all sub-areas which do have at least a defined (configurable) minimum location probability and draw an ellipse around all of them. It will result in ellipses that are possibly too large, but this is unavoidable, as the limitations of the grid and the input data for the grid do not allow calculating ellipses so small. So the location area determination module 37 first checks if there are not more than a defined (configurable) maximum number of sub-areas, e.g. 250, which do have at least a defined (configurable) minimum location probability. If the maximum number has not been exceeded, which is often related to small "clouds" (clusters) of sub-areas, the method continues in step S51; otherwise, the method continues in step S53.

In step S51, the location area determination module 37 defines a single ellipse 5 fitting around a polygon 6 enveloping probable sub-areas having at least the defined (configurable) minimum location probability.

In step S52, the location area determination module 37 checks the density of these sub-areas inside the ellipse. If the density is higher than a defined (configurable) minimum density, the method continues in step S62; otherwise, the method continues in step S53.

In step S53, the location area determination module 37 tries to use more than one ellipse for a description of the location probability of an antenna. The main idea in this step is to group connected sub-areas around "seeds" with high probability. As the probabilities between two adjacent sub-areas do often change significantly and the following method is very dependent on the change of probability between adjacent sub-areas, the location probabilities are first smoothed for this step by a defined (configurable) factor. For example, the location probabilities are smoothed out using a smoothing filter as known for example in digital image processing. The sub-areas 41, 43 are then sorted in a list according to their location probabilities. Starting with the first sub-area in the list and in descending order of their location probabilities, sub-areas are selected in a list for further processing until the sum of their location probabilities reaches a defined (configurable) minimum target probability, e.g. 25%. All other sub-areas are not processed for ellipse creation any more. Starting with the first sub-area in the list, all those sub-areas from the list are selected for the first cloud of sub-areas, which share a common border with sub-areas already included in the first cloud. The method is then repeated for all other non selected clouds of sub-areas, starting for the next cloud with the first non selected sub-area from the list. Step S53 ends when all sub-areas from the list have been assigned to a cloud. To avoid too many clouds or clouds that are too small, the creation of clouds is stopped if the number of sub-areas included in a cloud meets a stopping criteria, e.g. if the number of sub-areas in a new cloud is below 10% of the sub-areas belonging to the first cloud. Subsequently, for each cloud an ellipse 5 is fitted around polygon 6 enveloping all sub-areas of a cloud.

With exception of small ellipses, the resulting ellipses are usually too big, as they do always include all sub-areas of a cloud, covering a lot of empty space. It Is possible to reduce the size of these ellipses, resizing them around areas with high density of sub-areas. In an embodiment, the optimization is based on three steps:

a) The length of both the long and the short axis of the ellipse 5 are extended/shortened in a linear fashion, until the area of the ellipse 5 is equal to the area of the polygon 6. This results in a smaller ellipse, which typically describes the "gravity" center of the ellipses.
b) As the shrinking process of step a) is only based on geometric criteria, it is possible that important sub-areas, having a high location probability, are removed. To take these important sub-areas into account, small clouds are generated from sub-areas having a location probability twice the mean probability of the respective sub cloud. Convex envelopes and polygons are constructed around these small clouds. It is possible that these small clouds protrude from the ellipse from step a).
c) A final convex envelope is constructed around the ellipse from step a) and the sub-areas of the polygons from step b). The ellipse is approximated in this step with a number of typical points of the ellipse. Around the envelope, the final ellipse is fit which contains the shrunken ellipse from a) but also the best points of the sub cloud from b).

In step S64, the location area determination module 37 checks if the number of ellipses 5 exceeds a defined (configurable) maximum number of ellipses, e.g. 10. In this case the method continues in step S55; otherwise, the method continues in step S62.

In step S55, the location area determination module 37 checks if the target probability has reached 100%. In this case the method continues in step S57; otherwise, the method continues in step S56.

In step S56, the location area determination module 37 increases the target probability by a defined (configurable) incremental value, e.g. 5%, and continues in step S53.

Although the method may seem complex and difficult to implement, it has a significant advantage: it requires much less processing time than many other methods. For a cloud including n sub-areas, the time needed to complete the calculation is of the order of $O(n*\log(n))$ On a conventional PC, a cloud of 15,000 sub-areas is processed in less than 10 minutes.

In step S57, the location area determination module 37 uses an improved but more complex approach to determine more than one ellipse to define the location area. The main idea is the same as in step S53, with the difference not to search for direct connected sub-areas but also for sub-areas which are more away from the ellipses already created, checking for each of them if there is enough probability covered in the area between them and the nearest ellipse. All the sub-areas are therefore in a first step sorted in a list by their decreasing location probabilities. Starting with the first sub-area of the list, a new ellipse is created at the location of the sub-area. In descending order of their location probabilities, it is checked whether the next sub-area can be used to extend its nearest ellipse. It does extend the nearest ellipse, if it is separated from the nearest ellipse by an intermediate area 8 having at least a defined (configurable) minimum mean location probability, i.e. an intermediate area, e.g. a circle, comprising sub-areas with at least a minimum average location probability. If the sub-area does not match the criteria, a new ellipse is created around this sub-area as long as a defined (configurable) maximum number of ellipses has not been reached. If the maximum has been reached the sub-area is ignored and does not influence the construction of the ellipses. As the sub-areas are processed according to their location probability, this happens typically to sub-areas which do have a low location probability and are therefore less important than sub-areas from the beginning of the list. The whole procedure is repeated for ail sub-areas of the list until all are processed once, or the sum of the location probabilities of the sub-areas which were not ignored reaches a defined (configurable) minimum target probability.

In step S58, the location area determination module 37 checks if the defined (configurable) minimum target probability has been reached. If this is the case, the method continues in step S62; otherwise, the method continues in step S59.

Figure 7:
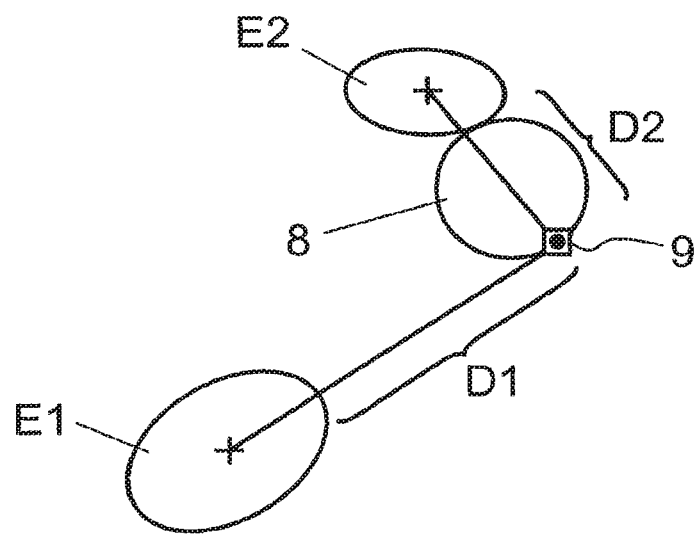
FIG. 7 shows a diagram illustrating more than one ellipse, and an intermediate area separating a sub-area from its closest ellipse.

As illustrated in FIG. 7, as soon as there are in step S57 more than one ellipses E1, E2, the location area determination module 37 checks in step S57 for the remaining sub-areas 9, in descending order of their location probabilities, whether the sub-areas 9 are to be included in the ellipse E2 located closest to its location. In the example shown in FIG. 7, checked is whether the sub-areas included in intermediate area 8, which separates sub-area 9 from its closest ellipse E2 (distance D2 is shorter than distance D1), have at least a defined (configurable) minimum mean location probability.

In step S69, as the desired defined (configurable) minimum target probability has not been reached, the location area determination module 37 determines whether the threshold for the minimum mean location probability of the intermediate area between the respective sub-area and its closest ellipse has reached a value below a defined (configurable) minimum probability. If this is the case, the method continues in step S61; otherwise, the method continues in step S60 to prepare a next trial with a lower threshold.

In step S60, the location area determination module 37 lowers the minimum mean location probability for the intermediate area by a defined (configurable) amount, e.g. by 75%, and continues in step S57 to start a new approach to describe the distribution of location probability with multiple ellipses.

In Step S61, the location area determination module 37 generates a warning indicating to an operator that there was no method which could describe successfully in an optimal way the user location area through ellipses. However the last set of ellipses generated in step S57 is used for output and the method continues in step S62.

In step S62, the location area determination module 37 generates an output signal with a graph showing the location area with one or more ellipses. For example, the ellipse(s) associated with the determined location area are shown on a display, printed on paper, send in a message or included in an image file.

The first approach, described in the context of steps S50-S52, and the second approach, described in the context of steps S53-S56, require processing times in the order of O(n*log(n)), for n sub-areas. The third approach requires a processing time in the order of O(n2). While the third approach is significantly slower than the first and second approach, it is a useful and necessary fallback strategy for compensating shortcomings of the previous approaches. Practical results from real life data have shown the first approach is used in 11% of all cases; the second approach is used in 88%; while the third approach is used in 1% of all cases.

What is claimed is:

1. A method for managing communication in a mobile device, the method comprising:
   determining, based on a first probability and a second probability, a first area probability as a likelihood that the mobile device is located within a first area, wherein:
   determining the first probability based on a likelihood that a signal received in the first area from a first base station has signal strength above a measured signal strength for a signal received from the first base station, and
   determining the second probability based on a likelihood that a signal received in the first area from a second base station has signal strength below the measured signal strength;
   determining, based on a third probability and a fourth probability, a second area probability indicative of the mobile device being located within a second area, wherein:
   determining the third probability based on a likelihood that a signal received in the second area from the first base station has signal strength above the measured signal strength, and
   determining the fourth probability based on a likelihood that a signal received in the second area from the second base station has signal strength below the measured signal strength; and
   adjusting one or both of the first area probability and the second area probability based on one or more network parameters other than measured signal strength;
   determining based on the first area probability and the second area probability whether the mobile device is located in the first area or the second area.

2. The method of claim 1, wherein the first probability is calculated from a distribution associated with the first base station and the first area.

3. The method of claim 1, wherein the second probability is calculated from a distribution associated with the second base station and the first area.

4. The method of claim 1, wherein the third probability is calculated from a distribution associated with the first base station and the second area.

5. The method of claim 1, wherein the fourth probability is calculated from a distribution associated with the second base station and the second area.

6. The method of claim 1, wherein the first probability is a likelihood that a signal received in the first area from the first base station has signal strength no more than a threshold amount above the measured signal strength.

7. The method of claim 1, wherein the third probability is a likelihood that a signal received in the second area from the first base station has signal strength no more than a threshold amount above the measured signal strength.

8. The method of claim 1, wherein the mobile device is determined to be located in the first area if the first area probability is greater than the second area probability.

9. The method of claim 1, wherein the mobile device is determined to be located in the first area if the first area probability is greater than the second area probability and if the first area probability is above a threshold.

10. The method of claim 1, wherein the first area probability is based on a product of the first probability, the second probability and a fifth probability, and wherein the fifth probability is a likelihood that a signal received in the first area from a third base station has signal strength below the measured signal strength.

11. A mobile device comprising:
   a receiver configured to receive signals from base stations; and
   a processor configured to:
   determine, based on a first probability and a second probability, a first area probability as a likelihood that the mobile device is located within a first area, wherein:
   determining the first probability is based on a likelihood that a signal received in the first area from a first base station has signal strength above a measured signal strength for a signal received from the first base station, and
   determining the second probability is based on a likelihood that a signal received in the first area from a second base station has signal strength below the measured signal strength;
   determine, based on a third probability and a fourth probability, a second area probability indicative of the mobile device being located within a second area, wherein:
   determining the third probability is based on a likelihood that a signal received in the second area from the first base station has signal strength above the measured signal strength, and
   determining the fourth probability is based on a likelihood that a signal received in the second area from the second base station has signal strength below the measured signal strength; and
   adjust one or both of the first area probability and the second area probability based on one or more network parameters other than measured signal strength; and
   determine based on the first area probability and the second area probability whether the mobile device is located in the first area or the second area.

12. The mobile device of claim 11, wherein the first probability is calculated from a stored distribution associated with the first base station and the first area.

13. The mobile device of claim 11, wherein the second probability is calculated from a stored distribution associated with the second base station and the first area.

14. The mobile device of claim 11, wherein the third probability is calculated from a stored distribution associated with the first base station and the second area.

15. The mobile device of claim 11, wherein the fourth probability is calculated from a stored distribution associated with the second base station and the second area.

16. The mobile device of claim 11, wherein the first probability is a likelihood that a signal received in the first area from the first base station has signal strength no more than a threshold amount above the measured signal strength.

17. The mobile device of claim 11, wherein the third probability is a likelihood that a signal received in the second area from the first base station has signal strength no more than a threshold amount above the measured signal strength.

18. The mobile device of claim 11, wherein the mobile device is determined to be located in the first area if the first area probability is greater than the second area probability.

19. The mobile device of claim 11, wherein the mobile device is determined to be located in the first area if the first area probability is greater than the second area probability and if the first area probability is above a threshold.

20. The mobile device of claim 11, wherein the first area probability is based on a product of the first probability, the second probability and a fifth probability, and wherein the fifth probability is a likelihood that a signal received in the first area from a third base station has signal strength below the measured signal strength.

* * * * *